United States Patent
Yamamoto et al.

(10) Patent No.: US 8,135,742 B2
(45) Date of Patent: Mar. 13, 2012

(54) PROXY SERVICE PROVIDING APPARATUS, SERVICE PROVIDING METHOD, AND NETWORK SYSTEM

(75) Inventors: Naoko Yamamoto, Yokohama (JP); Masaji Munekuni, Kawasaki (JP); Shigeki Mori, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1222 days.

(21) Appl. No.: 11/696,932

(22) Filed: Apr. 5, 2007

(65) Prior Publication Data

US 2008/0033962 A1 Feb. 7, 2008

(30) Foreign Application Priority Data

Apr. 7, 2006 (JP) .................. 2006-106501

(51) Int. Cl.
*G06F 7/00* (2006.01)
*G06F 17/30* (2006.01)
(52) U.S. Cl. ............................ 707/781; 709/223; 726/12
(58) Field of Classification Search .................. None
See application file for complete search history.

(56) References Cited

U.S. PATENT DOCUMENTS

| 6,574,678 | B1 * | 6/2003 | Nykanen et al. | 710/10 |
| 7,209,915 | B1 * | 4/2007 | Taboada et al. | 707/755 |
| 2005/0165912 | A1 * | 7/2005 | Colbeck et al. | 709/219 |
| 2006/0167969 | A1 * | 7/2006 | Andreev et al. | 709/202 |
| 2006/0212935 | A1 * | 9/2006 | Burman et al. | 726/12 |

FOREIGN PATENT DOCUMENTS

| JP | 2001-051948 | 2/2001 |
| JP | 2001-346270 | 12/2001 |

\* cited by examiner

*Primary Examiner* — Khanh Pham
*Assistant Examiner* — Azam Cheema
(74) *Attorney, Agent, or Firm* — Cowan, Liebowitz & Latman, P.C.

(57) ABSTRACT

A proxy service providing apparatus includes a service search unit adapted to, upon receiving, from a connection device connectable to a network, a request of a service provided by each device connected to the network, search for a providable service to the connection device in accordance with a relationship with the connection device, and a providing unit adapted to replicate and provide the providable service to the connection device based on a search result of said service search unit.

7 Claims, 16 Drawing Sheets

DIGITAL CAMERA A

702
USABLE SERVICES:
   DISPLAY DEVICE
      REPRODUCTION
   CAMERA DEVICE
      PHOTOGRAPHING

703

MENU
   REPRODUCTION
   PHOTOGRAPHING

DIGITAL CAMERA B

705
USABLE SERVICES:
   DISPLAY DEVICE
      REPRODUCTION
   DATA DEVICE
      DATA SAVING, DATA TRANSMISSION

706

MENU
   REPRODUCTION
   DATA SAVING
   DATA TRANSMISSION

F I G. 13
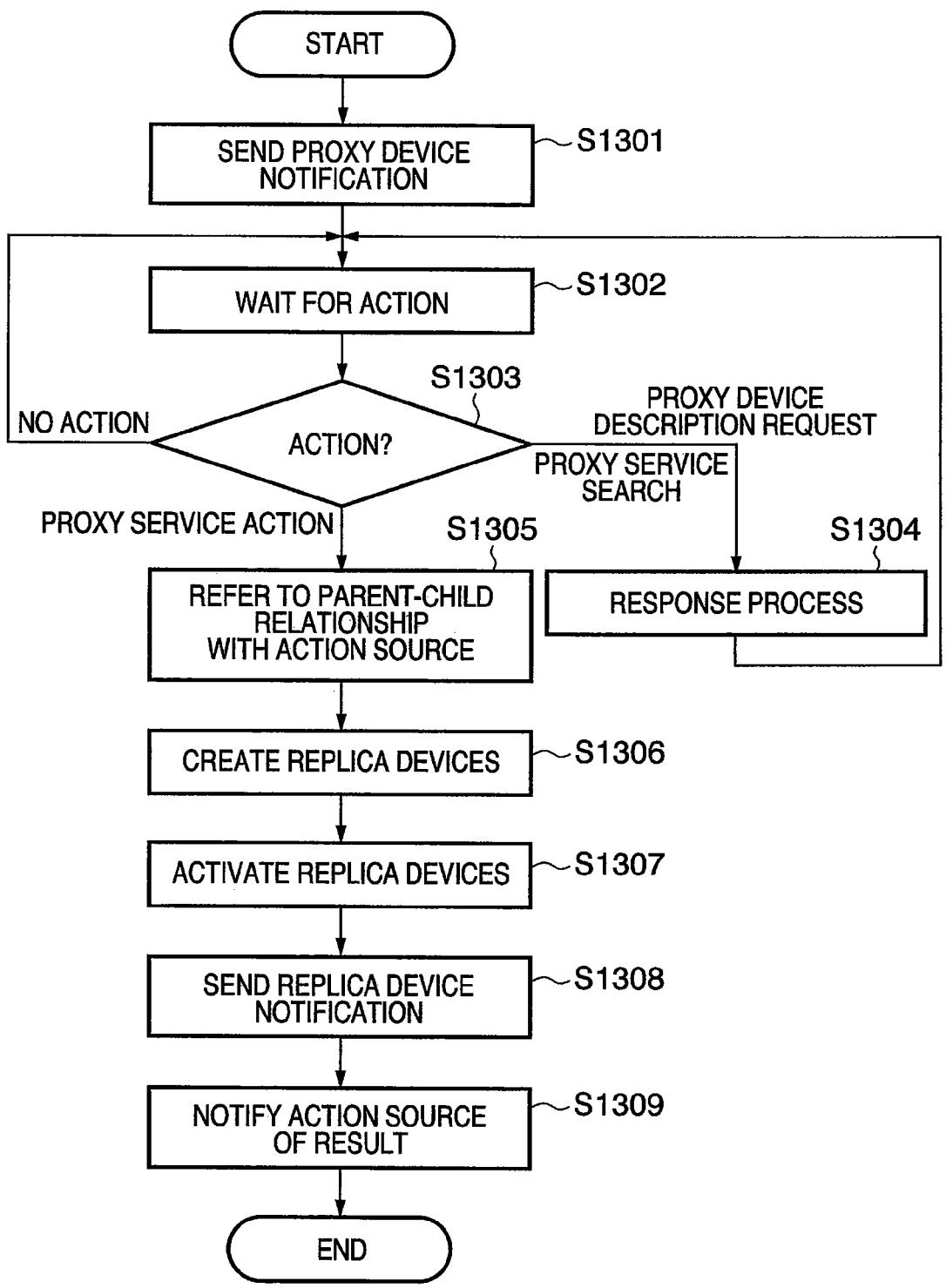

F I G. 15
PIOR ART
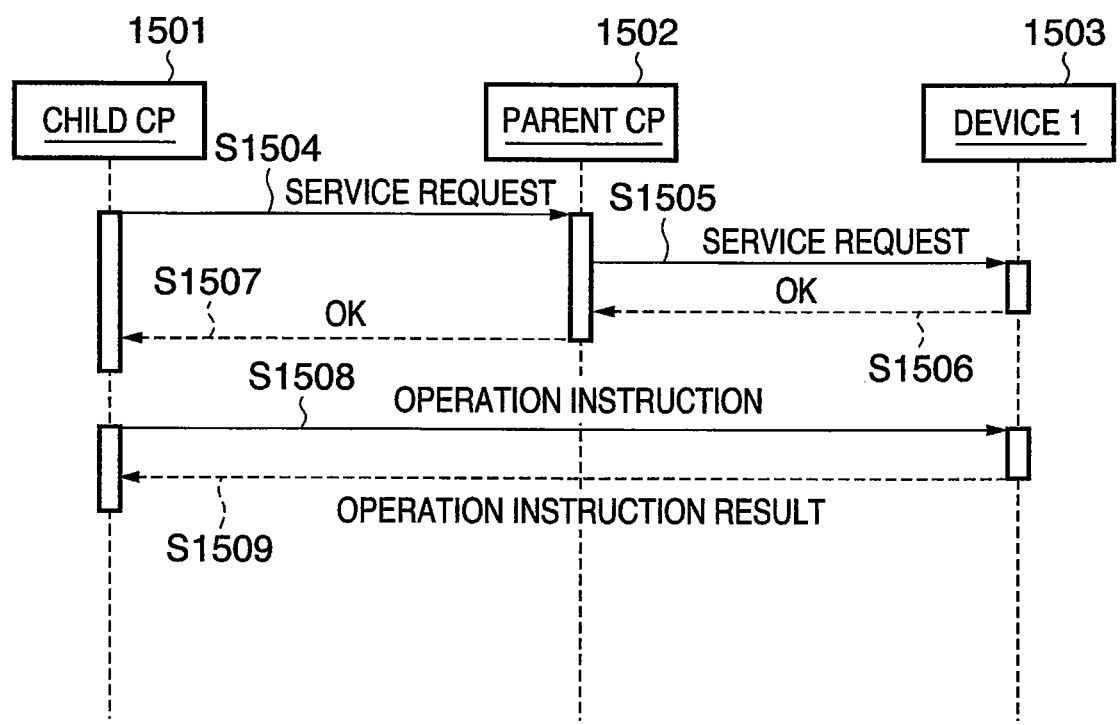

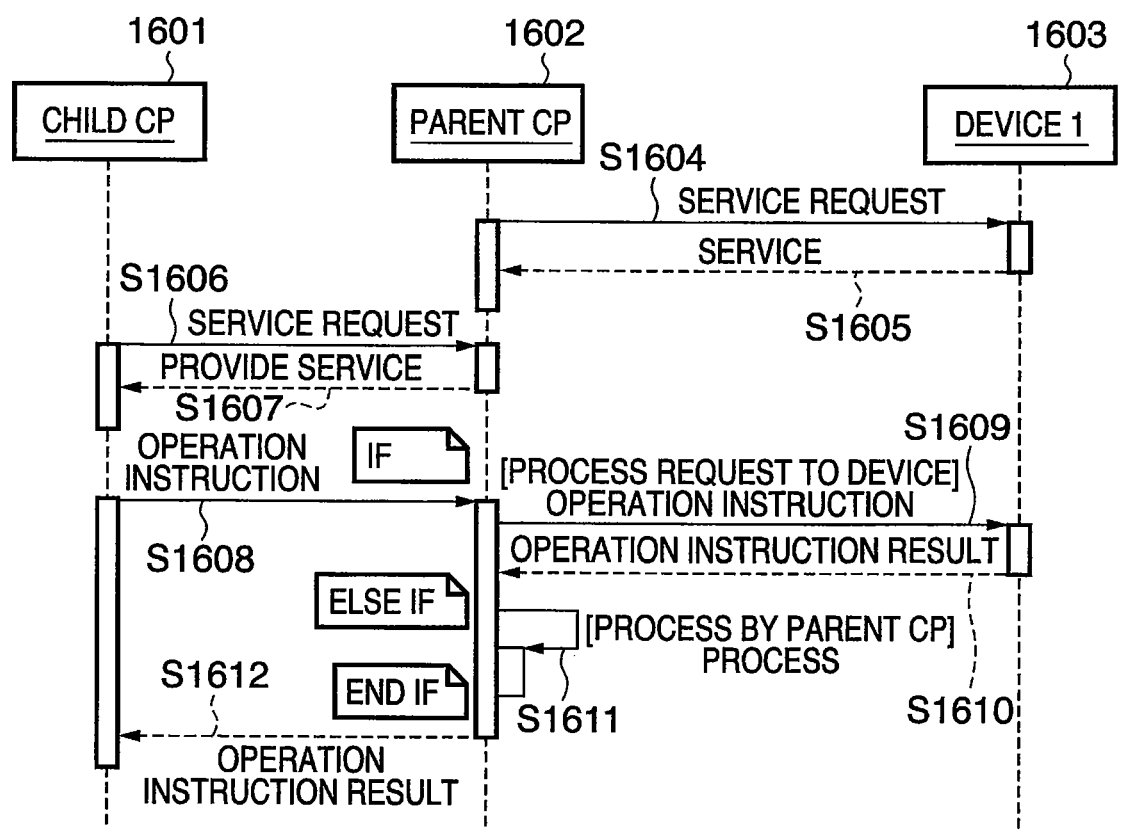

PROXY SERVICE PROVIDING APPARATUS, SERVICE PROVIDING METHOD, AND NETWORK SYSTEM

BACKGROUND OF THE INVENTION

1. Field of the Invention

The present invention relates to a proxy service providing apparatus using a plurality of devices connected to a network, a control method, and a network system.

2. Description of the Related Art

There are presently various digital home appliances, and partial networking to connect them has been implemented. For example, P2P (Peer To Peer) networking for a specific purpose is used to, for example, connect digital video recorders via IEEE1394 or connect a digital BS tuner to a D-VHS recorder via a PC. A home automation system using ECHONET executes centralized management of home air conditioning and illumination via a power line or wireless LAN.

The physical network type and connection procedure used for device networking change depending on the devices. To use an IP network, it is necessary to automatically set parameters in an environment without either a DHCP server or DNS server.

The UPnP Forum is pursuing standardization of a protocol to implement, in various physical networks, a function of automatically recognizing and setting devices connected to a network. The protocol is called UPnP (Universal Plug & Play). Use of UPnP allows each device to properly set network parameters by itself even in an environment without either a DHCP server or DNS server so that UPnP supporting devices can be aware of each other's existence, functions, and states.

FIG. 3 is a block diagram showing the basic arrangement of a UPnP network. A UPnP network is formed from three basic units: device, service, and control point. A device is a nested device serving as a service container. Each device has a device description that saves property information such as the device name and service set associated with itself. Another category is assigned to another service or nested device.

Referring to FIG. 3, an apparatus A 301 nests a device A 305 serving as the service container of a service A1 306 and a service A2 307. An apparatus B 302 nests a device B 308 serving as the service container of a service B 310. An apparatus C 303 nests a device C 311 serving as a Root device. The device C 311 serves as the service container of a service C1 313 and nests a built-in device 312 serving as the service container of a service C2 314 and a service C3 315. Each service such as the service A1, A2, B, C1, C2, or C3 is the minimum unit of control in the UPnP network. The service produces an action and models the state by using a state variable. A control point 304 serves as a controller to detect and control the remaining devices. The control point 304 may be incorporated in a device, like a control point B 309.

A network connected to UPnP supporting information processing apparatuses as shown in FIG. 8 will be examined as a prior art. Referring to FIG. 8, a control point (CP(a)) 801, UPnP camera 802, UPnP scanner 803, UPnP personal computer 804, and UPnP printer 805 connect to an IP network 806. The UPnP camera 802 includes a camera device 807 serving as the service container of a reproduction service 808 and a photographing service 809. The UPnP scanner 803 includes a scanner device 810 serving as the service container of a data scan service 811. The UPnP personal computer 804 includes a data device 812 serving as the service container of a data saving service 813 and a data transmission/reception service 814. The UPnP printer 805 includes a printer device 815 serving as the service container of a print service 816.

The UPnP camera 802 to UPnP printer 805 have a UPnP function. These connected devices multicast identification information (SSDP advertise message) to the IP network 806 at a predetermined interval when and after they connect to the IP network 806 and become usable from the CP(a) 801.

The CP(a) 801 searches for a device connected to the IP network 806 (by SSDP discovery message). A connected device matching the search condition replies to the CP(a) of the search source. The identification information (SSDP advertise message) includes the ID number (UUID) of the connected device and a device type indicating the type of the connected device. To newly search for devices and services, the CP(a) 801 designates "ssdp:all" in the ST header of the discovery message in UPnP. Then, all devices shown in FIG. 8 reply to the search. Thereby, a service list 817 on the IP network 806 is obtained.

A device incapable of directly accessing and operating devices and services can access them via another device having a capability or knowledge to access the devices and services. For example, in a business phone, a subsidiary unit of a telephone set can access a public network via the master unit. A device in a network can access another device outside the network by using a gateway or a proxy that executes encryption for the device.

Japanese Patent Laid-Open No. 2001-51948 discloses an access control technique of, when a device outside a network requests access to another device in the network, receiving (relaying) the access based on preset access permission conditions or contents.

Japanese Patent Laid-Open No. 2001-346270 discloses a technique related to a home server which has a plurality of pieces of service information to guide the services of a plurality of kinds of home devices and control execution of the services, thereby allowing the user to use the services from a portable device.

The arrangement of the UPnP supporting information processing apparatuses in the network shown in FIG. 8 is expressed as shown in FIG. 2. Referring to FIG. 2, reference numeral 201 denotes a device class in the network. The network includes a camera device 202 having a reproduction service 206 and a photographing service 207, and a data device 203 having a data saving service 208 and a data transmission/reception service 209. The network also includes a printer device 204 having a print service 210, and a scanner device 205 having a data scan service 211.

A CP(a) 212 shown in FIG. 2 can use only the reproduction service 206 of the camera device 202 in the network. That is, when the arrangement of the information processing apparatuses in FIG. 8 is expressed as in FIG. 2, the CP(a) 801 can use only "the reproduction service 808 of the camera device 807" in the service list 817 in the network.

When search is done by designating "ssdp:all" in the ST header of the discovery message in UPnP, all devices shown in FIG. 8, reply to the search so that the service list 817 on the network is obtained. However, even when the CP(a) 801 wants to select and operate the data saving service 813 (data device 812), the operation is impossible because the CP(a) 801 has neither the capability nor the knowledge to operate the device. In addition, the device operation authorization of the CP(a) 801 may be insufficient.

In other words, a control point of UPnP supporting information processing apparatuses may be able to search for usable services in the network but be unable to directly operate them. A control point searches for usable services in the network by designating "ssdp:all" in the ST header of the discovery message or designating a device category or service that can be handled by the control point itself.

Even when the CP(a) 801 has only a capability to transmit data but neither capability nor knowledge to receive data, it is impossible to use only the data transmission service in the data transmission/reception service 814.

Additionally, even when the efficiency can be improved by combining, for example, the data scan service 811 and print service 816 and using them as a new service (copy service), the CP(a) 801 cannot use the combined service.

In a business phone, a device can access and operate other devices and services which cannot directly be accessed and operated by the device. For example, when the main device connects to one to n master units, one to n subsidiary units connected to each master unit can use the service. However, if the master unit is absent, the subsidiary units can do nothing.

Assume that a PHS is usable as a subsidiary unit, and the main device is a public network. If a master unit exists, a private mode is set between the master unit and the subsidiary unit. If no master unit exists or the master unit is far away, the subsidiary unit can operate in a public mode. In this case, however, the master unit and subsidiary unit are connected in the private mode so that the master unit mediates communication of the subsidiary unit. Even when the master unit exists, it is impossible to provide different services to the respective subsidiary units.

Even in Japanese Patent Laid-Open No. 2001-51948, the access control apparatus that receives access permission only relays communication to a service that is present in the network. Therefore, a device that accesses from outside the network can only use the service in the network by using the access control apparatus.

In Japanese Patent Laid-Open No. 2001-346270, a portable device can be used like a remote controller of a home server. However, services guided on the home server are the services of home devices, which do not change from those usable without the home server (when the portable device is in home).

As described above, it is impossible in the prior arts to use only the subset of a device or service that cannot directly be accessed and operated by a device or to use a combined service of a plurality of services.

SUMMARY OF THE INVENTION

The present invention provides a technique of allowing a device to use only the subset of a device or service that cannot directly be accessed or operated or use a combined service of a plurality of services.

A proxy service providing apparatus according to one aspect of the present invention includes a service search unit adapted to, upon receiving, from a connection device connectable to a network, a request of a service provided by each device connected to the network, search for a providable service to the connection device in accordance with a relationship with the connection device, and a providing unit adapted to replicate and provide the providable service to the connection device based on a search result of said service search unit.

A control method of a proxy service providing apparatus according to another aspect of the present invention includes steps of a service searching step of, upon receiving, from a connection device connectable to a network, a request of a service provided by each device connected to the network, searching for a providable service to the connection device in accordance with a relationship with the connection device, and a providing step of replicating and providing the providable service to the connection device based on a search result in the service searching step.

A network system according to still another aspect of the present invention includes a plurality of devices connected to a network, wherein said plurality of devices include at least one proxy service providing apparatus and at least one remote control apparatus, and wherein said proxy service providing apparatus includes a service search unit adapted to search for a providable service to the remote control apparatus from services of the device connected to the network based on a relationship with the remote control apparatus, and a providing unit adapted to replicate and provide the providable service to the remote control apparatus based on a search result of said service search unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a flowchart showing a replica device creation process according to the embodiment of the present invention.

FIG. 15 is a sequence chart showing a sequence when a device with restrictions on the operation operates a device service via a proxy service providing device in a prior art.

FIG. 16 is a sequence chart showing a sequence when a device with restrictions on the operation operates a device service via a proxy service providing device in the embodiment.

DESCRIPTION OF THE EMBODIMENTS

Preferred embodiments of the present invention will be described with reference to the accompanying drawings.

Figure 9:
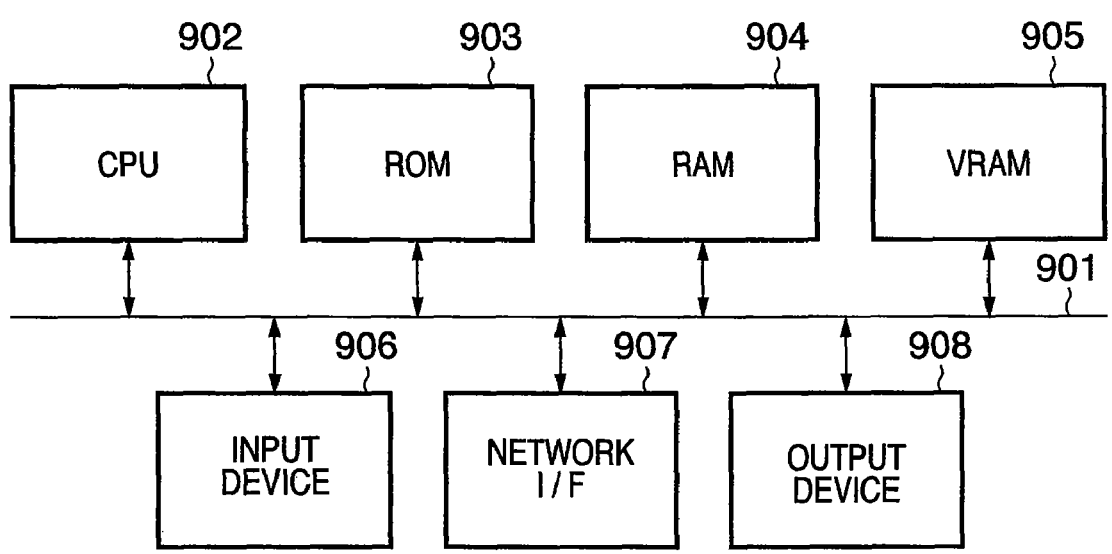
FIG. 9 is a block diagram showing the hardware arrangement of a control point according to the embodiment of the present invention.

FIG. 9 is a block diagram showing the arrangement of a control point CP(a) 801. A CPU 902 executes operations and logical determinations for various kinds of processes and controls constituent elements connected to a bus 901. The CP(a) 801 includes a memory including a program memory and a data memory.

The program memory stores programs for control by the CPU 902, including the process procedures to be described later with reference to the flowcharts. The memory may be either a ROM 903 or a RAM 904 into which programs are loaded from, for example, an external storage device.

An input device 906 to input information from a user includes a mouse, touch panel, and keyboard or the like. An output device 908 to output analyzed data output information includes a display device such as a CRT or a liquid crystal display device. A VRAM 905 holds contents to be displayed on the display device. A network I/F 907 communicates with another device connected to the network.

In the present embodiment, a control point incapable of directly accessing and operating devices in a network establishes a parent-child relationship (fiduciary relationship) with another control point capable of accessing and operating the devices. With this arrangement, the control point incapable of directly accessing and operating the devices in the network can access and operate them.

Figure 14:
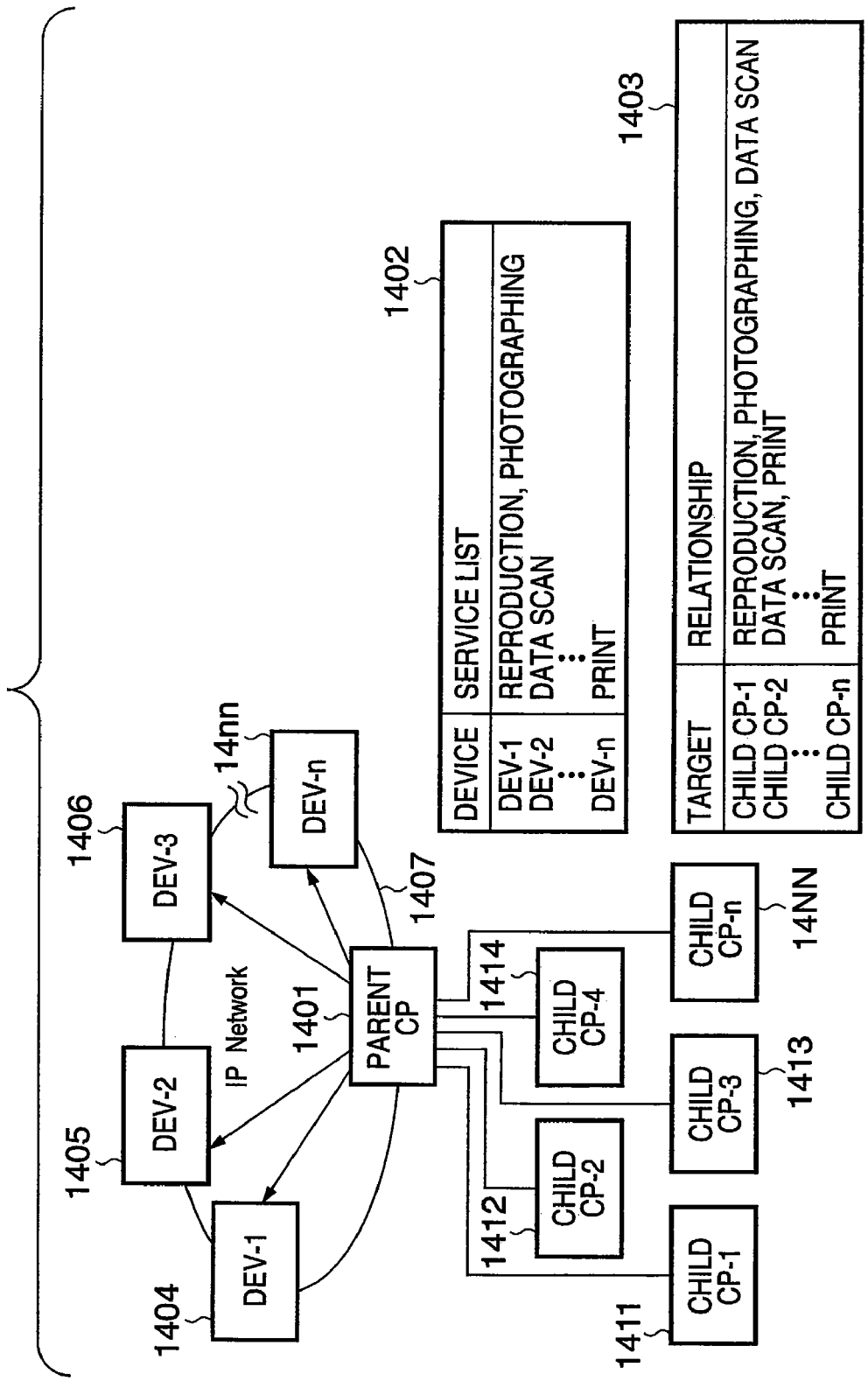
FIG. 14 is a view showing the arrangement of a system that allows a device with restrictions on the operation to operate a device service via a proxy service providing device in the embodiment.

FIG. 14 is a view showing the arrangement of a system that allows a device with restrictions on the operation to operate a device service via a proxy service providing device in the present embodiment. A device (parent CP) 1401 to provide a proxy service can use device services between n devices DEV-1 1404, DEV-2 1405, DEV-3 1406, and DEV-n 14nn on an IP network 1407. A service list 1402 shows the services usable by the parent CP 1401.

The parent CP 1401 establishes a parent-child relationship (fiduciary relationship) 1403 with n control points with restrictions on the operation and access. The n control points include a child CP-1 1411, child CP-2 1412, child CP-3 1413, child CP-4 1414, and child CP-n 14NN. The parent CP 1401 generates a service from the service list 1402 on the IP network 1407 based on child CP connection conditions of the child CP-1 1411 to child CP-n 14NN and provides different services to the respective child CPs. This sequence will be described later in detail.

Figure 10:
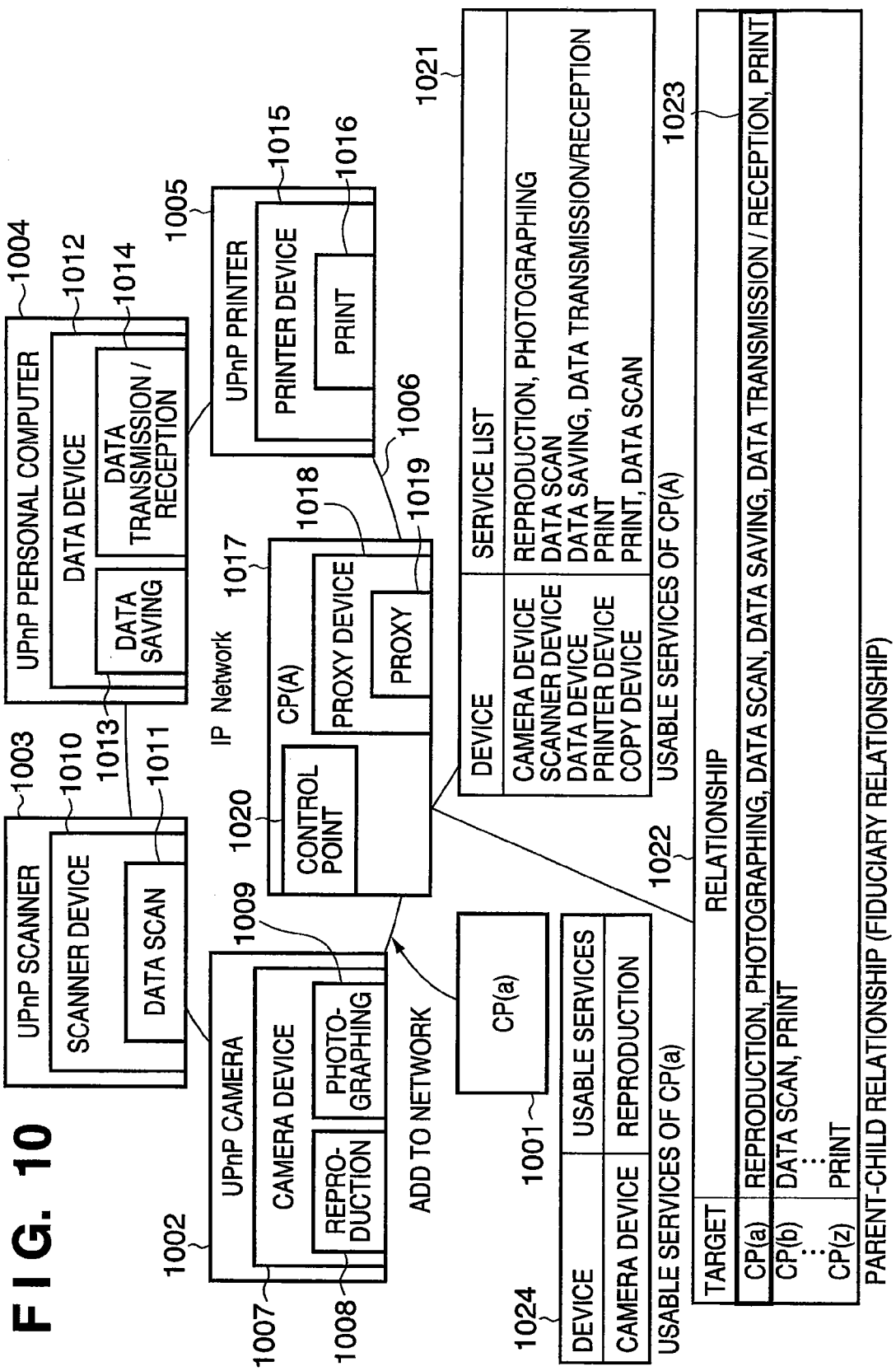
FIG. 10 is a view showing the arrangement of a network connected to UPnP supporting information processing apparatuses according to the embodiment of the present invention.

In the present embodiment, a UPnP camera 1002, UPnP scanner 1003, UPnP personal computer 1004, UPnP printer 1005, and CP(A) 1017 connect to an IP network 1006, as shown in FIG. 10. The UPnP camera 1002 includes a camera device 1007 serving as the service container of a reproduction service 1008 and a photographing service 1009. The UPnP scanner 1003 includes a scanner device 1010 serving as the service container of a data scan service 1011. The UPnP personal computer 1004 includes a data device 1012 serving as the service container of a data saving service 1013 and a data transmission/reception service 1014. The UPnP printer 1005 includes a printer device 1015 serving as the service container of a print service 1016. The CP(A) 1017 includes a UPnP control point 1020 and a proxy device 1018 serving as the service container of a proxy service 1019.

The CP(A) 1017 may be either a control point capable of using the services of all devices on the IP network 1006, which are shown in a service list 1021, or a control point capable of using only some of them. A process of newly connecting a CP(a) 1001 to the IP network 1006 will be described below. The CP(A) 1017 has a fiduciary relationship 1022 in advance. The fiduciary relationship 1022 also defines a fiduciary relationship 1023 to the CP(a) 1001.

The CP(a) 1001 is a control point capable of using only the reproduction service 1008 of the camera device 1007 of the devices shown in FIG. 10. A usable service 1024 indicates the service usable by the CP(a) 1001.

Figure 1:
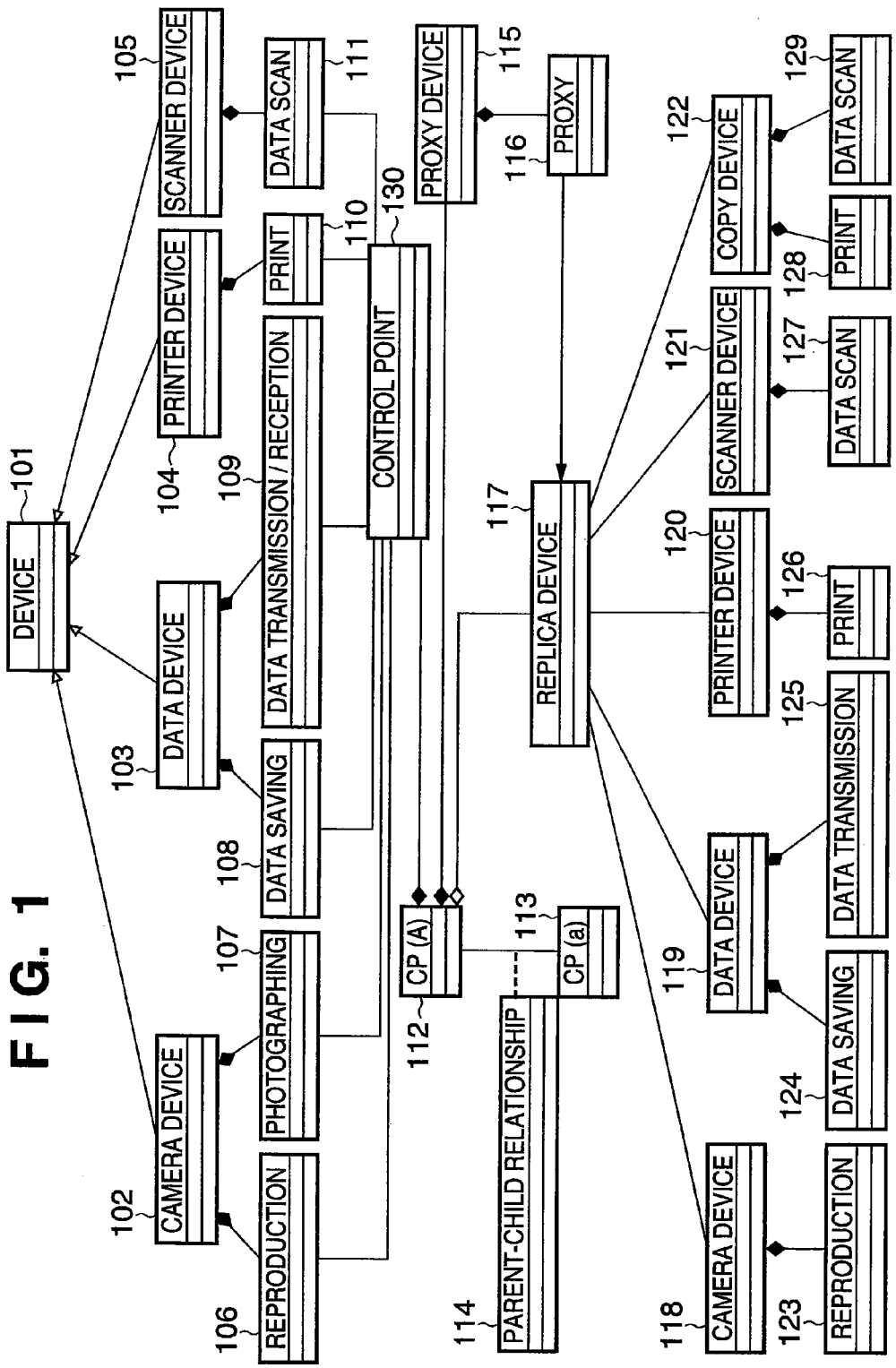
FIG. 1 is a view showing the arrangement of information processing apparatuses according to an embodiment of the present invention.
Figure 2:
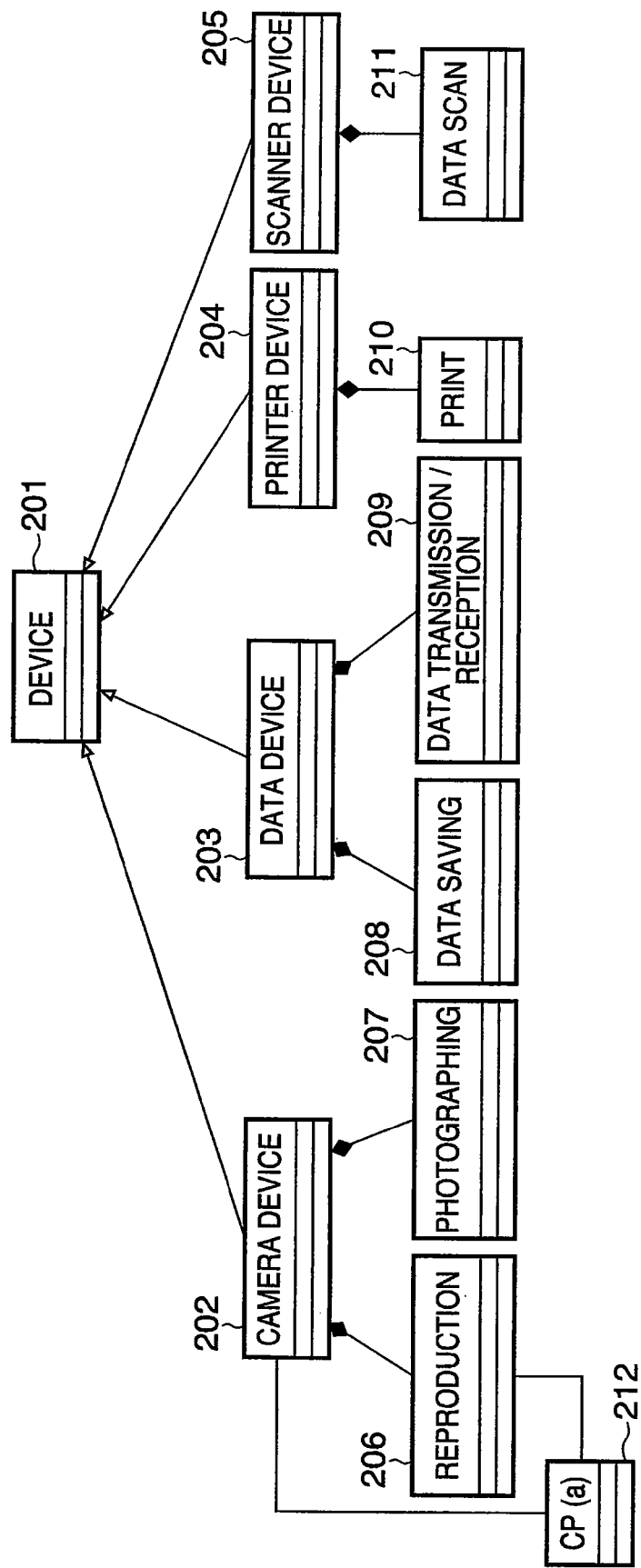
FIG. 2 is a view showing the arrangement of information processing apparatuses according to a prior art.
Figure 3:
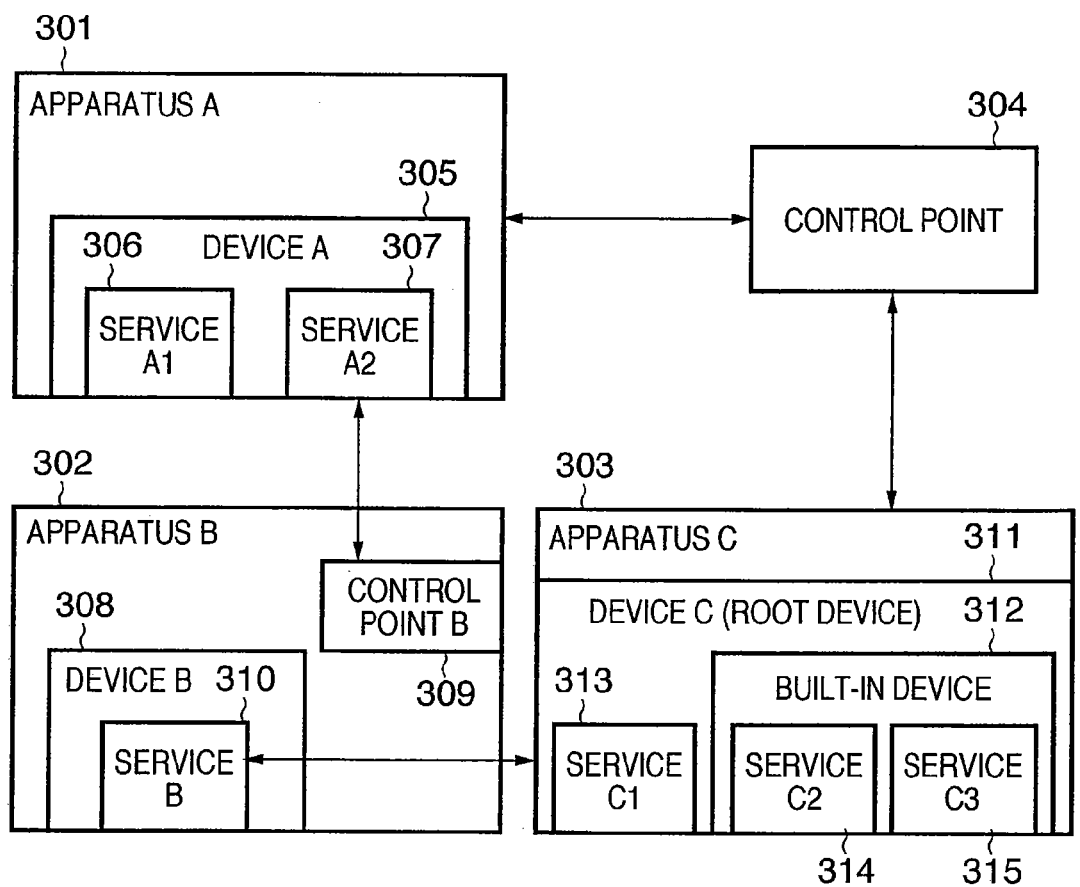
FIG. 3 is a block diagram showing the basic arrangement of a UPnP network.

FIG. 1 is a view showing the arrangement of the information processing apparatuses in FIG. 10. Referring to FIG. 1, reference numeral 101 denotes a device class in the network. The network includes a camera device 102 having a reproduction service 106 and a photographing service 107, and a data device 103 having a data saving service 108 and a data transmission/reception service 109. The network also includes a printer device 104 having a print service 110, and a scanner device 105 having a data scan service 111.

A control point 130 of a CP(A) 112 can use all services including the reproduction service 106 of the camera device 102 to the data scan service 111 of the scanner device 105. The CP(A) 112 includes a proxy device 115 having a proxy service 116. A parent-child relationship 114 is defined in advance between the CP(A) 112 and a control point CP(a) 113 to be newly added. When the CP(a) 113 connects to the network, the control point 130 creates a replica device 117. More specifically, the control point 130 creates the replica device 117 from the reproduction service 106 to the data scan service 111 usable in the network in accordance with the parent-child relationship 114 by using the proxy service 116 of the CP(A) 112.

In the present embodiment, the replica device 117 includes a camera device 118 having a reproduction service 123, a data device 119 having a data saving service 124 and a data transmission service 125, and a printer device 120 having a print service 126. The replica device 117 also includes a scanner device 121 having a data scan service 127, and a copy device 122 having a print service 128 and a data scan service 129.

Figure 11:
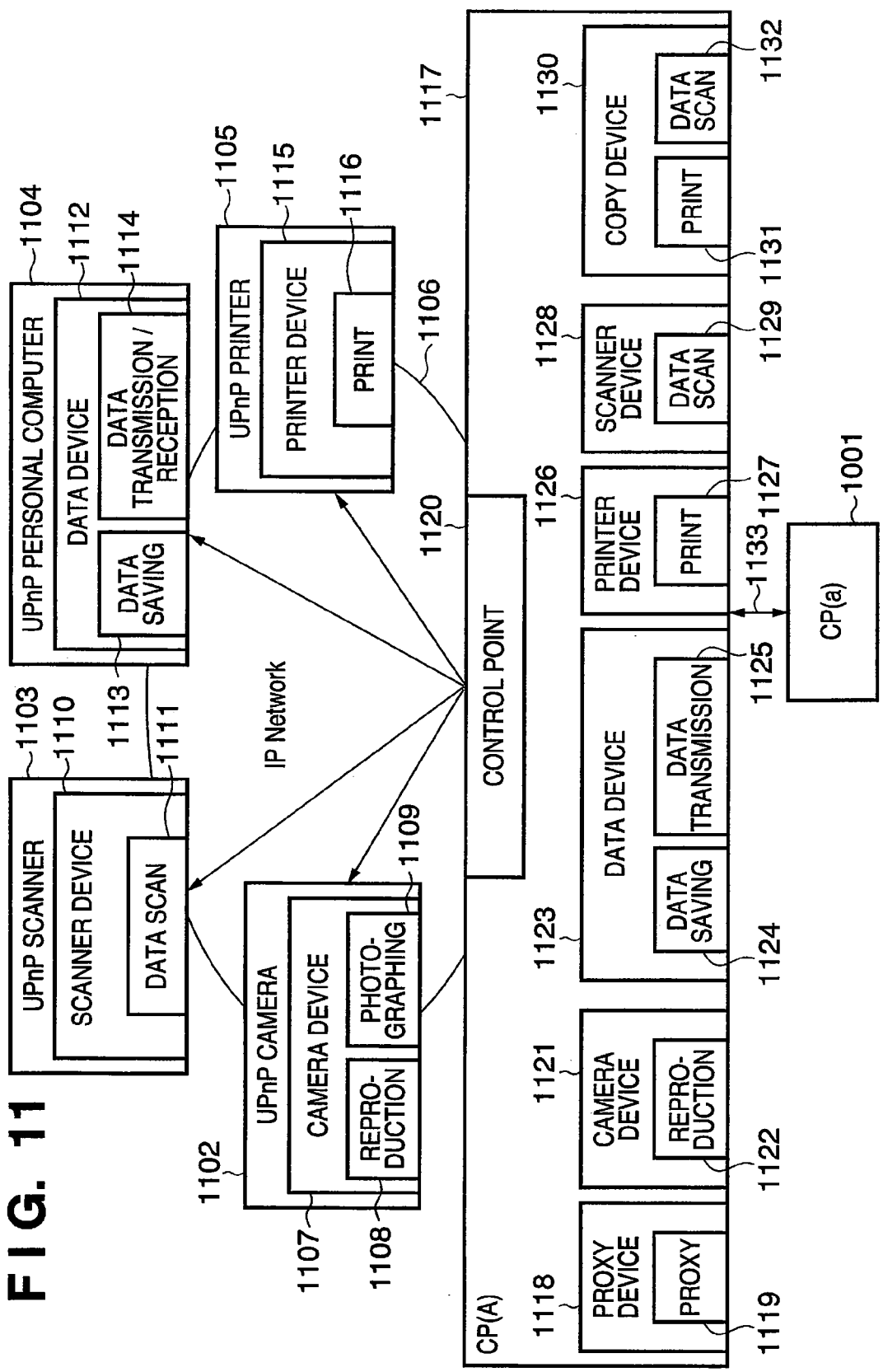
FIG. 11 is a block diagram showing the arrangement of information processing apparatuses and an information system when a new control point is connected in the embodiment of the present invention.

FIG. 11 is a block diagram showing the arrangement of the information processing apparatuses and an information system when the CP(a) 1001 newly joins in. the present embodiment. The arrangement of a UPnP camera 1102 to a control point 1120 is the same as in FIG. 10. A CP(a) 1001 accesses a proxy service 1119 to create replicas of various devices operable from the control point 1120. In the present embodiment, a camera device 1121 having a reproduction service 1122 is created as a replica of a camera device 1107. A data device 1123 having a data saving service 1124 and a data transmission service 1125 is created as a replica of a data device 1112. A printer device 1126 having a print service 1127 is created as a replica of a printer device 1115. A scanner device 1128 having a data scan service 1129 is created as a replica of a scanner device 1110. In addition, a copy device 1130 as a combined device of the scanner device 1110 and printer device 1115 is created. The copy device 1130 serves as the service container of a print service 1131 and a data scan service 1132. The CP(a) 1001 can use these replica services by communication 1133 with a CP(A) 1117. That is, the number of services usable by the CP(a) increases.

The process of creating a replica service will be described.

Figure 12:
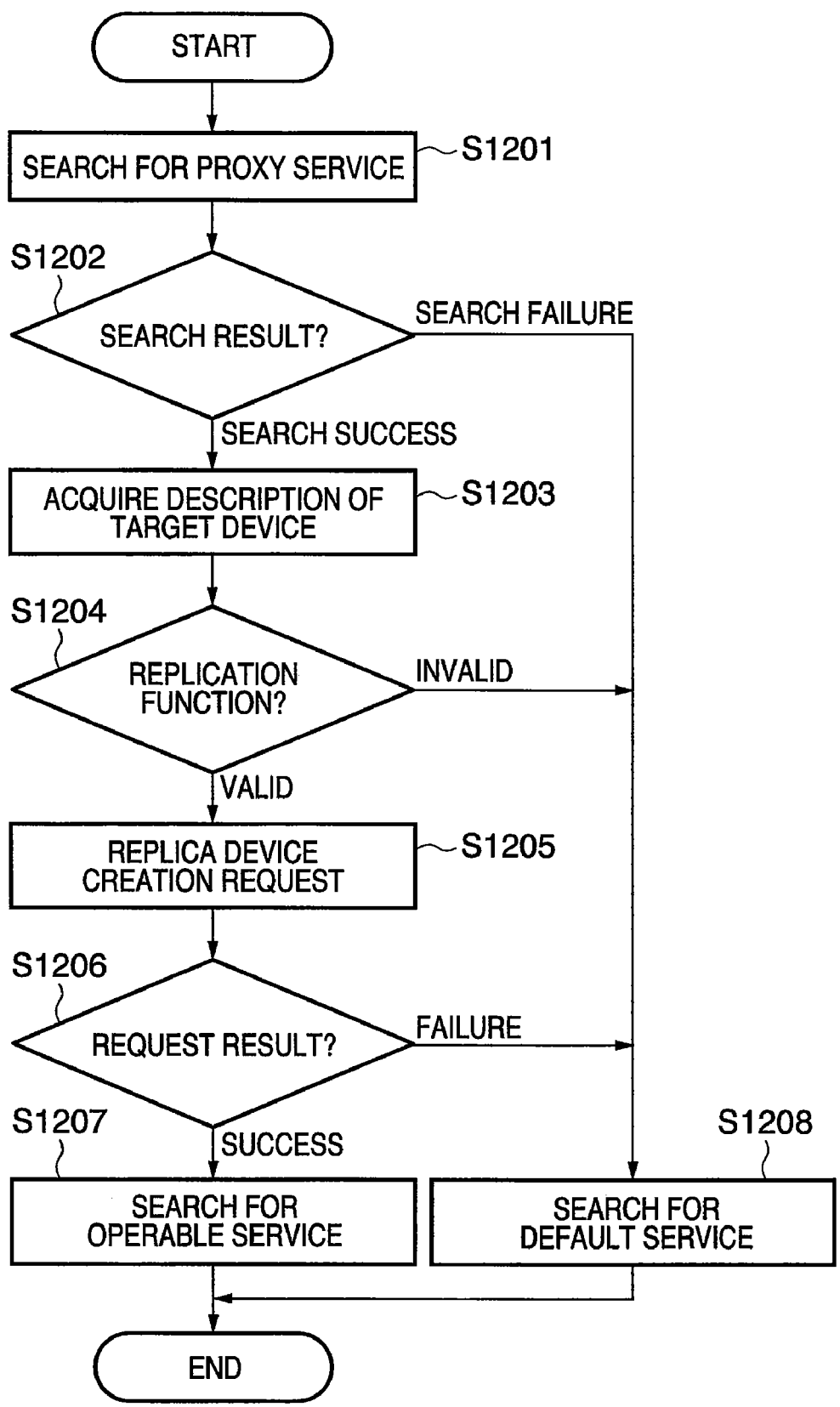
FIG. 12 is a flowchart showing a proxy device search process according to the embodiment of the present invention.

FIG. 12 is a flowchart showing the process of the CP(a) 1001 when it newly connects to the IP network 1006 in FIG. 10. The CP(a) 1001 added to the IP network 1006 searches for a proxy service in step S1201. The CP(a) 1001 waits for the search result (step S1202). Upon receiving a reply from a device with a proxy service, the process advances to step S1203 to acquire the description of the target device obtained from the search result. In step S1204, the CP(a) 1001 determines based on the acquired device description whether the target device has a valid replication function of providing a replica service to the CP(a) 1001.

More specifically, if the parent-child relationship (fiduciary relationship) 114 shown in FIG. 1 is present between the CP(a) 1001 and the target device that has responded to the search, the CP(a) 1001 determines that the target device can provide a replica service to the CP(a) 1001. If the replication function of the target device is valid, the process advances to step S1205. The CP(a) 1001 issues a replica device creation request. If it is determined in step S1206 that the target device having the proxy service has successfully created a replica device, the process advances to step S1207. In step S1207, it is possible to detect the service of the replica device created by the proxy service by searching for all operable services. On the other hand, if the proxy service search has failed in step S1202, if the replication function of the target device with the proxy service is invalid in step S1204, or if the replica device creation request has failed in step S1206, the process advances to step S1208. In step S1208, the CP(a) 1001 searches for a default service and operates as a control point capable of using only limited services.

FIG. 13 is a flowchart showing the process of the CP(A) 1017 when it connects to the IP network 1006, and then, the CP(a) 1001 newly connects to the IP network 1006 in FIG. 10. In step S1301, the CP(A) 1017 connected to the IP network 1006 multicasts the advertise message of the proxy device included in itself. This allows searching for proxy devices and proxy services in the remaining devices on the network. The CP(A) 1017 waits for an action to itself (step S1302). In the present embodiment, the CP(A) 1017 waits for transmission of search matching itself or transmission of a description request or an action to itself by listening to a standard multicast address. Steps S1302 to S1303 are repeated until an action occurs. If an action to the CP(A) 1017 has occurred in step S1303, and the action indicates a proxy service search or proxy device description request, the process advances to step S1304. In step S1304, the CP(A) 1017 responds to the search. If the action in step S1303 is a proxy service action, the process advances to step S1305. In step S1305, the CP(A) 1017 refers to the parent-child relationship with respect to the action source. The CP(A) 1017 creates replica devices based on the, parent-child relationship (step S1306). In the present embodiment, the CP(A) 1017 refers to the services of the camera device 1007 to printer device 1015 in the network by using the control point 1020 and replicates each device based on the parent-child relationship. The CP(A) 1017 also creates a device having a subset service of each device or a new device by combining a plurality of services of the devices. In step S1307, the CP(A) 1017 activates the services of the created replica devices to activate them. In step S1308, the CP(A) 1017 notifies (advertises) the network of each activated replica device. In step S1309, the CP(A) 1017 notifies the action source (CP(a) 1001) of the replica device creation result.

Constitution of the system shown in FIG. 11 by connecting the CP(a) 1001 in FIG. 10 to the network will be described below with reference to FIGS. 12 and 13.

When the network has the arrangement shown in FIG. 10, the CP(A) 1017 is notifying (advertising) the network of the proxy service 1019 of the proxy device 1018 included in itself in step S1301 in FIG. 13. The CP(A) 1017 is waiting for an action to itself while repeating the process in steps S1302 and S1303.

Figure 6:
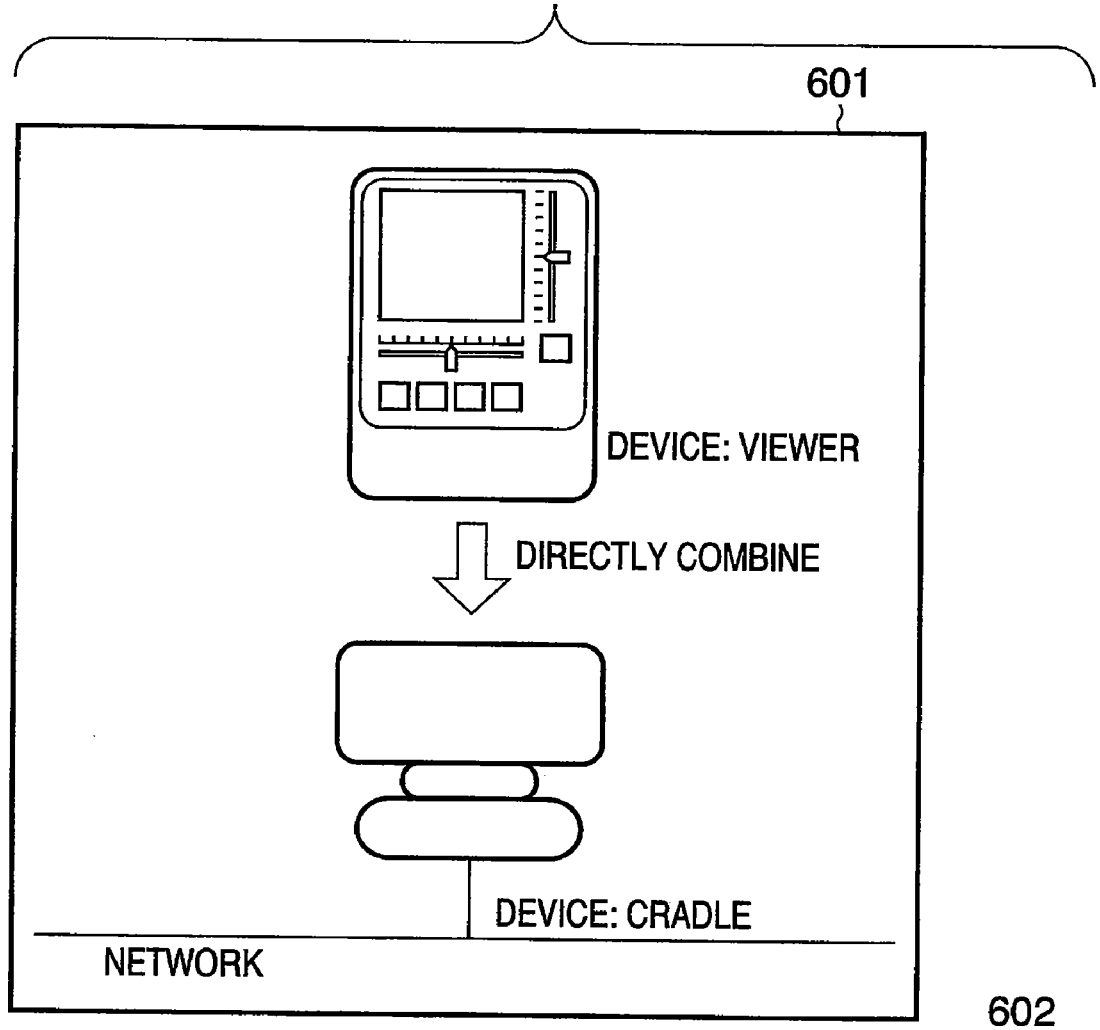
FIG. 6 is a view showing a method of connecting devices to a network according to the embodiment of the present invention.
Figure 6:
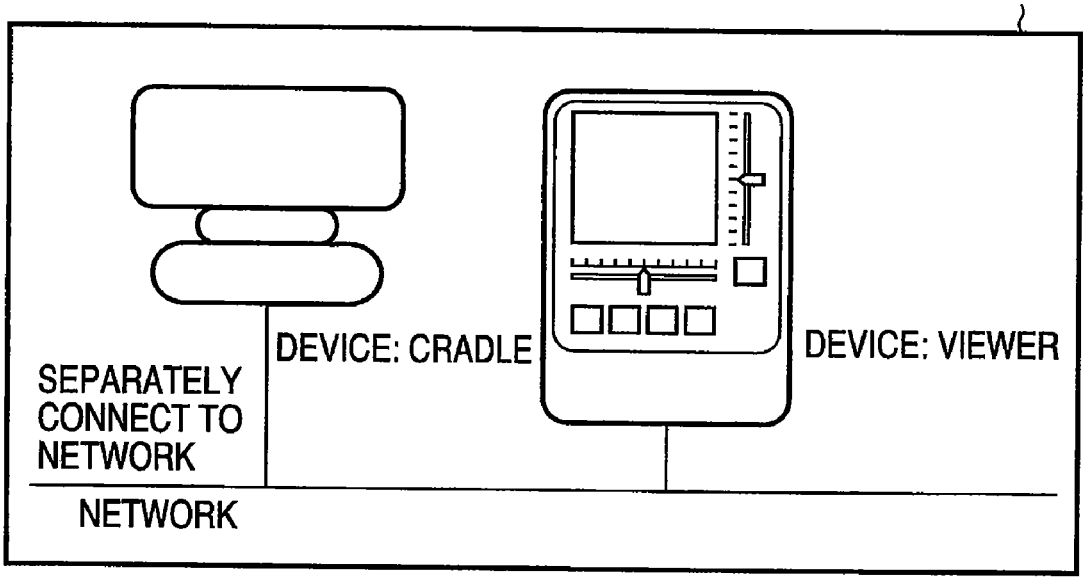

Assume that the CP(a) 1001 newly connects to the network. The CP(a) 1001 and CP(A) 1017 need not physically contact each other, as indicated by 601 in FIG. 6. Alternately, the CP(a) 1001 like, for example, a portable viewer may join the network by combining with the CP(A) 1017 like a viewer cradle, as indicated by 602 in FIG. 6.

At this time, in step S1201 in FIG. 12, the CP(a) 1001 searches for a proxy service controllable by itself. To search for a proxy service, a general discovery message in UPnP is usable. If the CP(a) 1001 combines with a device including a proxy device physically having a proxy service, the proxy service may be recognized by another means.

In step S1304, the CP(A) 1017 responds to the search from the CP(a) 1001. In step S1202, the CP(a) 1001 receives the response message from the CP(A) 1017 having the proxy service 1019. The process advances to step S1203. The CP(a) 1001 requests acquisition of the device description of the target device CP(A) 1017. In step S1304, the CP(A) 1017 returns a response to the proxy device description request.

The CP(a) 1001 refers to the parent-child relationship 114 (FIG. 1) defined between itself and the CP(A) 1017 and determines that the replication function of the CP(A) 1017 to provide a replica service is valid. The process advances to step S1205. In step S1205, the CP(a) 1001 issues a replica device creation request to the CP(A) 1017. In step S1305, the CP(A) 1017 refers to the parent-child relationship 114 with respect to the action source (CP(a) 1001) and creates replica devices (step S1306). More specifically, as the function of the proxy service 1019, the CP(A) 1017 creates replica devices from the services (reproduction service 1008 to print service 1016) usable in the network in accordance with the parent-child relationship 114 by using the control point 1020. When the replica devices are created, the network arrangement changes to that shown in FIG. 11. The replica devices created in the present embodiment are the camera device 1121 having the reproduction service 1122, and the data device 1123 having the data saving service 1124 and data transmission service 1125. The printer device 1126 having the print service 1127, the scanner device 1128 having the data scan service 1129, and the copy device 1130 having the print service 1131 and data scan service 1132 are also created as the replica devices. The printer device 1126 is the replica of the printer device 1115. The scanner device 1128 is the replica of the scanner device 1110. The data device 1123 is the subset device of the data device 1112 and includes the data transmission service 1125 as the subset service of a data transmission/reception service 1114. The camera device 1121 is the subset device of the camera device 1107. The camera device 1107 includes the reproduction service 1122, but does not include the data device 1123 of the camera device 1107. The copy device 1130 is created as the combined device of the scanner device 1110 and printer device 1115.

In step S1307, the CP(A) 1017 activates the replica devices created in step S1306. In step S1308, the CP(A) 1017 notifies (advertises) the network of the replica devices. In step S1309, the CP(A) 1017 notifies CP(a) 1001 of the action source of the replica device creation result. When the CP(A) 1017 creates the replica devices, the CP(a) 1001 advances to step S1207 based on the determination (replica device request result) in step S1206. In step S1207, the CP(a) 1001 searches for operable services by referring to the replica device creation result and operates as a control point to use the replica services created by the CP(A) 1017. The CP(a) 1001 may be reactivated as a control point dedicated to the replica services provided by the CP(A) 1017. From step S1207, a closed network may be formed by the communication 1133 between the CP(a) 1001 and the CP(A) 1117.

When the CP(a) 1001 operates as a control point defining the replica services of the CP(A) 1017 as a category, the network arrangement changes to that shown in FIG. 11. When the CP(a) 1001 wants to use the replica services (the reproduction service 1122 of the camera device 1121 to the data scan service 1132 of the copy device 1130), for example, commands and responses to use the services of the replica sources are transmitted/received. The CP(A) 1117 may replicate all the functions and complete the processes in itself. For example, assume that the CP(a) 1001 takes an action to use the print service 1127 of the printer device 1126. In this case, the CP(A) 1117 executes printing via a print service 1116 of the printer device 1115 by using the control point 1120 and outputs sheets to the discharge tray of a UPnP printer 1105. When an action to use the data saving service 1124 of the data device 1123 has occurred, data may directly be saved in a storage medium locally provided in the CP(A) 1117. That is the CP(A) 1117 may complete the service in itself without using the replica source service (a data saving service 1113 of the data device 1112).

The CP(a) 1001 need not always have a capability to use the replica services provided by the CP(A) 1117. The proxy service providing apparatus may have the capability on behalf of the CP(a) 1001.

FIG. 15 shows a sequence when a device that cannot directly be operated is operated by using, for example, a proxy service in a prior art. Referring to FIG. 15, a child CP 1501 with restrictions on the access and operation uses the service of a device 1 1503 by using the proxy service of a parent CP 1502. In step S1504, the child CP 1501 issues a service request to the parent CP 1502. In step S1505, the parent CP 1502 sends the service request to the device 1 1503. Upon receiving the service request from the parent CP 1502, the device 1 1503 returns an OK message to the parent CP 1502 in step S1506. In step S1507, the parent CP 1502 returns the OK message to the child CP 1501. From this point of time, the operation is done between the child CP 1501 and the device 1 1503. For example, upon receiving an operation instruction (step S508) from the child CP 1501, the device 1 1503 returns an operation instruction result (step S1509).

FIG. 16 shows a sequence when a device that cannot directly be operated is operated in the present embodiment. Assume that a child CP 1601 with restrictions on the access and operation uses the service of a device 1 1603 by using the proxy service of a parent CP 1602. In step S1604, the parent CP 1602 issues a service request to the device 1 1603. In step S1605, the parent CP 1602 receives a service from the device 1 1603 to prepare the service to be provided to the child CP 1601. Upon receiving a service request from the child CP 1601 (step S1606), the parent CP 1602 provides the service in step S1607. When an operation instruction is received from the child CP 1601 (step S1608) in association with an operation that requires sending a process request to the device 1 1603, the parent CP 1602 sends the operation instruction to the device 1 1603 in step S1609. In step S1610, the parent CP 1602 receives the result of the operation instruction (operation instruction result). When the parent CP 1602 itself can execute the process of the operation instruction received in step S1608, the parent CP 1602 executes the process by itself in step S1611. In step S1612, the parent CP 1602 returns the operation instruction result in step S1610 or S1611 so that the operation from the child CP 1601 can be executed.

In the present embodiment, when a device with restrictions on the access and operation newly connects to a network, a proxy service providing apparatus with a defined parent-child relationship creates a replica service in accordance with the parent-child relationship and provides the service to the device with restrictions on the access and operation. The device with restrictions on the access and operation can use the replica service. It is therefore possible to implement functions more than those obtained by direct access. If no proxy service providing apparatus exists in the network, the service of each device connected to the network can be used based on default restrictions.

The proxy service providing apparatus uses the service of each device connected to the network, and replicates the service of each device connected to the network, combines a plurality of services, and creates a subset service based on the parent-child relationship (fiduciary relationship). Hence, the device with restrictions on the access and operation can use more services than with direct access to a device connected to the network. Additionally, since a plurality of services are combined and provided, the device can efficiently use them as compared to when the target operation is executed by using individual services. Even when a device has, for example, no capability of using the transmission/reception service but a capability of using only the transmission service, that is, the device cannot use a service of certain level, it can use a service of lower (subdivided) level.

Even when the device with restrictions on the access and operation has no capability of using replica services provided by the proxy service providing apparatus, the proxy service providing apparatus provides the capability on behalf of the device. Hence, the device with restrictions on the access and operation can use all replica services provided by the proxy service providing apparatus.

The replica service based on the parent-child relationship mediates communication of commands and responses to the service of each device connected to the network and encodes/decodes the encrypted communication protocol on behalf of the device. The replica service is created by causing the proxy service providing apparatus to replicate all functions of the service. Hence, the operation process from the device with restrictions on the access and operation is done only between the proxy service providing apparatuses. Since no direct communication with each device connected to the network exists, high-level security can be ensured.

When a closed network is formed between the proxy service providing apparatuses, the operation process (action) from the device with restrictions on the access and operation can be prevented from being sent to the whole network. This also ensures high-level security.

Another embodiment will be described next, in which a digital camera can use more services when it is used together with a display having a parent-child relationship (fiduciary relationship).

Figure 4:
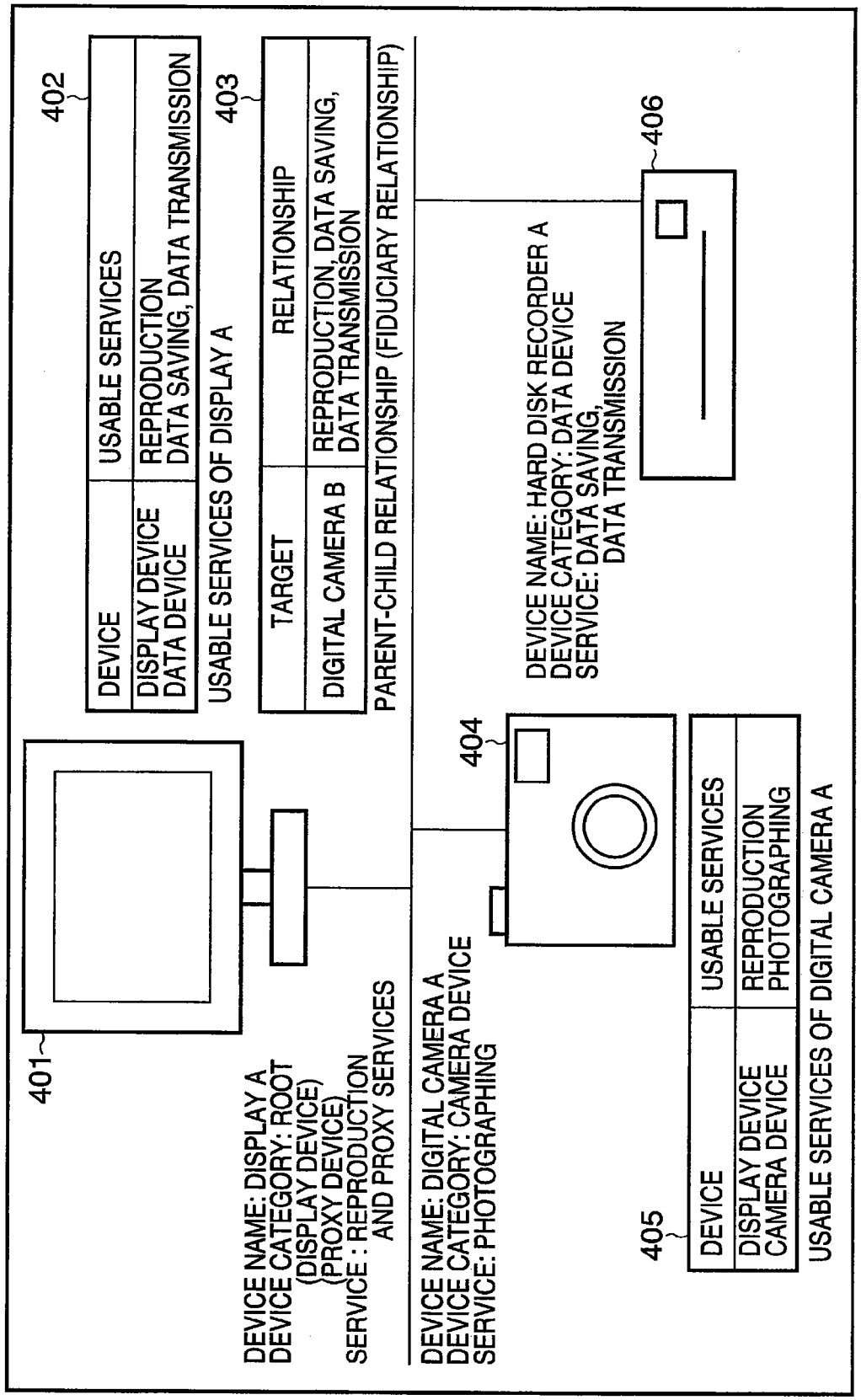
FIG. 4 is a view showing the arrangement of information processing apparatuses according to another embodiment of the present invention.

FIG. 4 is a view showing the arrangement of a network connected to information processing apparatuses according to this embodiment. Referring to FIG. 4, a display A 401, digital camera A 404, and hard disk recorder A 406 connect to the network.

The device category of the display A 401 includes a display device and a proxy device. The display A 401 has a reproduction service and a proxy service.

The display A 401 has a parent-child relationship (fiduciary relationship) 403 to provide a proxy service of "reproduction, data saving, and data transmission" to a device "digital camera B".

The display A 401 also has a control point function and can use the service of each device present in the network. In this embodiment, the display A 401 can use services on a service list 402. The display A 401 can use the reproduction service provided by the display device included in itself, and the data saving service and data transmission service provided by the data device included in the hard disk recorder A 406.

The device category of the digital camera A 404 is a camera device. The digital camera A 404 has a photographing service.

The digital camera A 404 also has a control point function and can use the service of each device present in the network. In the present embodiment, the digital camera A 404 can use services on a service list 405. The digital camera A 404 can use the reproduction service provided by the display device included in the display A 401, and the photographing service provided by the camera device included in itself.

Assume that the digital camera A 404 newly connects to the network shown in FIG. 4.

When the network has the arrangement shown in FIG. 4, the display A 401 is notifying (advertising) the network of the proxy service of the proxy device included in itself in step S1301 in FIG. 13. The display A 401 is waiting for an action to itself while repeating the process in steps S1302 and S1303.

Assume that the digital camera A 404 newly connects to the network. At this time, in step S1201 in FIG. 12, the digital camera A 404 searches for a proxy service controllable by itself. To search for a proxy service, a general discovery message in UPnP is usable. If the digital camera A 404 combines with a device including a proxy device physically having a proxy service, the proxy service may be recognized by another means.

In step S1304, the display A 401 responds to the search from the digital camera A-404. In step S1202, the digital camera A 404 receives the response message from the display A 401 having the proxy service. The process advances to step S1203. The digital camera A 404 requests acquisition of the device description of the display A 401. The display A 401 returns a response to the proxy device description request (step S1304). The digital camera A 404 refers to the parent-child relationship 403. Since no parent-child relationship is defined between the digital camera A 404 and the display A 401, the digital camera A 404 determines that the replication function to provide the replica service of the display A 401 is invalid. In step S1208, the digital camera A 404 searches for a default service so that the services (the reproduction service of the display device and the photographing service of the camera device) on the service list 405 can be used.

Figure 5:
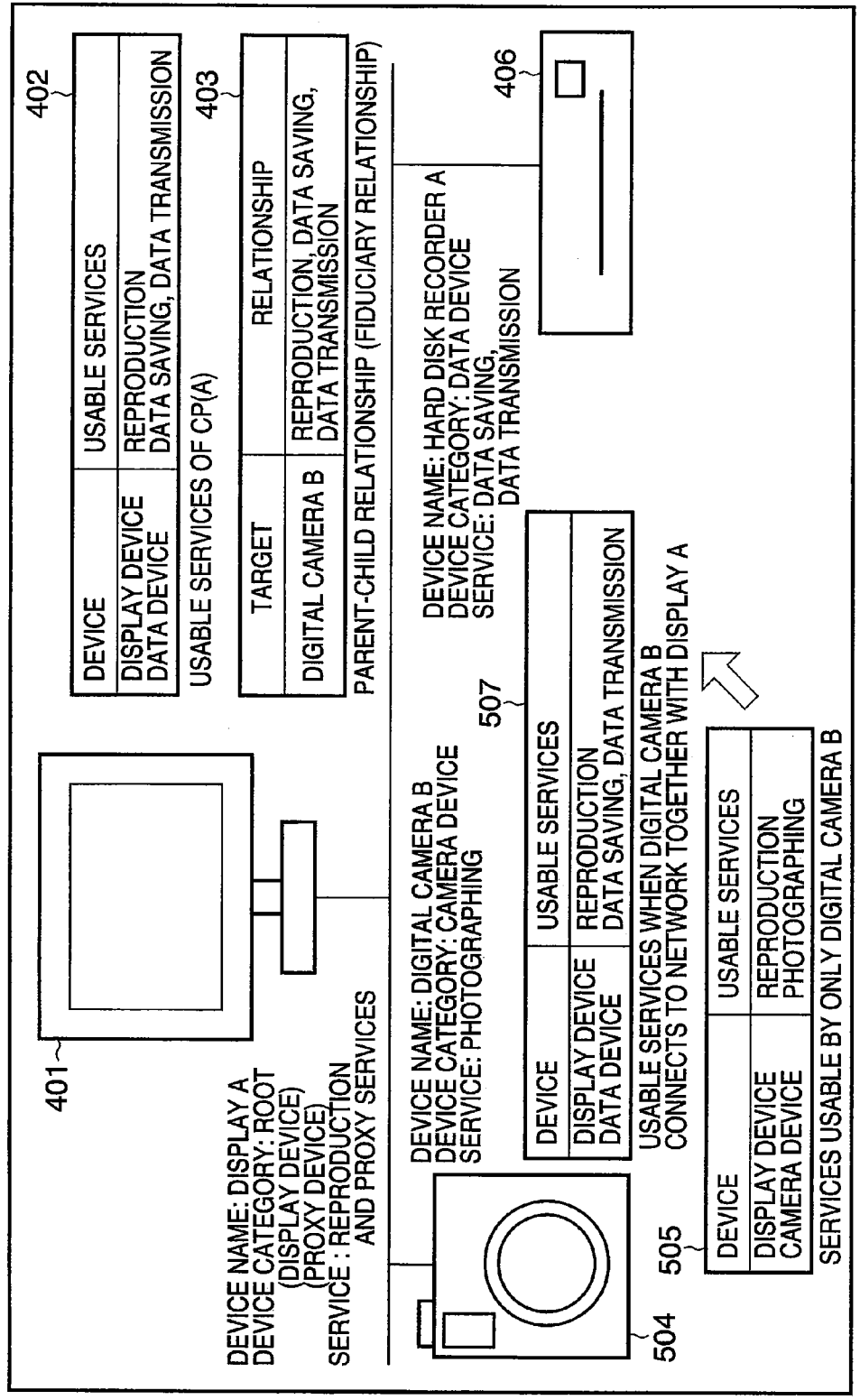
FIG. 5 is a view showing the arrangement of information processing apparatuses according to another embodiment of the present invention.

Next, assume that a digital camera B 504 newly connects to the network in place of the digital camera A 404, as shown in FIG. 5. In FIG. 5, the same reference numeral denotes the same element shown in FIG. 4. The device category of the digital camera B 504 is a camera device, like the digital camera A 404. The digital camera B 504 has a photographing service.

The digital camera B 504 also has a control point function and can use the service of each device present in the network. In the present embodiment, the digital camera B 504 can use services on a service list 505. The digital camera B 504 can use a reproduction service provided by a general display device, and the photographing service provided by the camera device included in itself, without being dependent on the Proxy service.

When the network has the arrangement shown in FIG. 5, the display A 401 is notifying (advertising) the network of the proxy service of the proxy device included in itself in step S1301 in FIG. 13. The display A 401 is waiting for an action to itself while repeating the process in steps S1302 and S1303.

Assume that the digital camera B 504 newly connects to the network. At this time, in step S1201 in FIG. 12, the digital camera B 504 searches for a proxy service controllable by itself.

In step S1304, the display A 401 responds to the search from the digital camera B 504. In step S1202, the digital camera B 504 receives the response message from the display A 401 having the proxy service. The process advances to step S1203. The digital camera B 504 requests acquisition of the device description of the display A 401. In step S1304, the display A 401 returns a response to the proxy device description request. The digital camera B 504 refers to the parent-child relationship 403 defined between itself and the display A 401 and determines that the replication function of the display A 401 to provide a replica service is valid. The process advances to step S1205. In step S1205, the digital camera B 504 issues a replica device creation request to the display A 401. In step S1305, the display A 401 refers to the parent-child relationship 403 with respect to the action source (digital camera B 504) and creates replica devices (step S1306). More specifically, as the function of the proxy service, the display A 401 creates replica devices from the service list 402 usable in the network in accordance with the parent-child relationship 403 by using a control point. When the replica devices are created, the digital camera B 504 can use the services (the reproduction service of the display device, the data saving service and data transmission service of the data device) on a service list 507.

Figure 7:
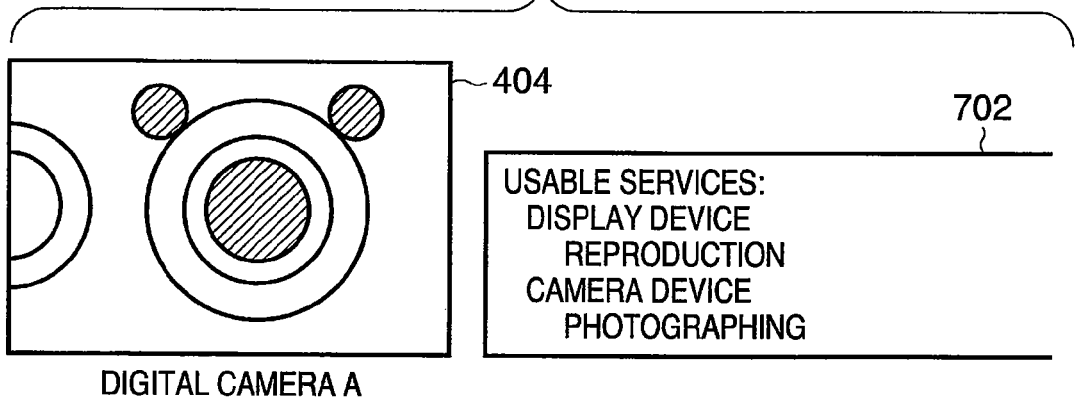
FIG. 7 is a view for explaining services usable by a device according to another embodiment of the present invention.
Figure 7:
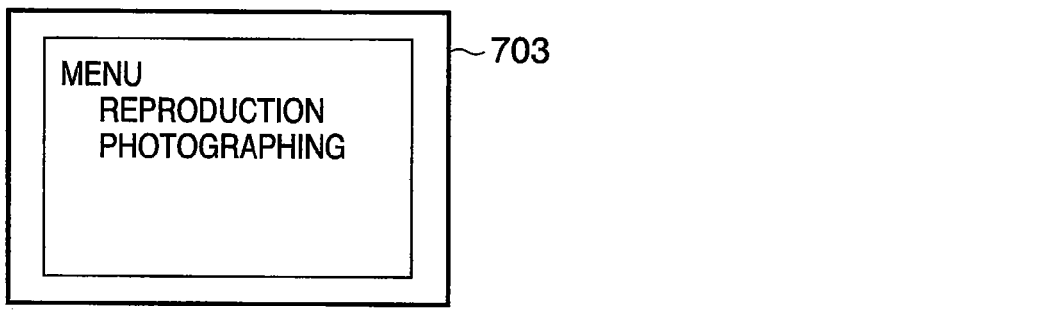
Figure 7:
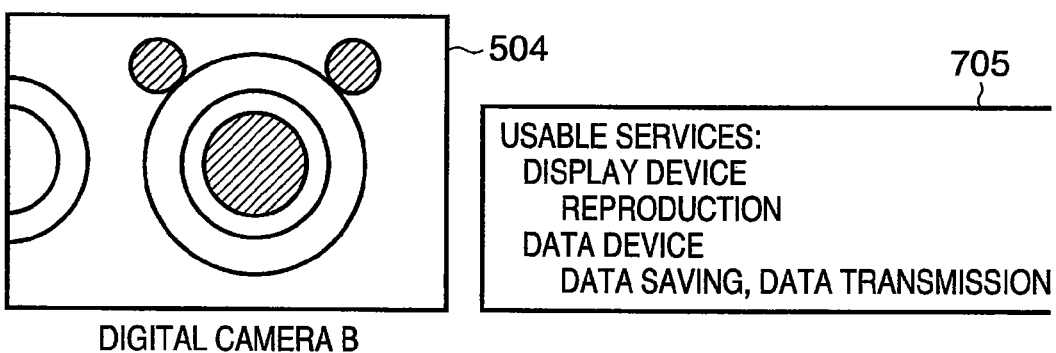
Figure 7:
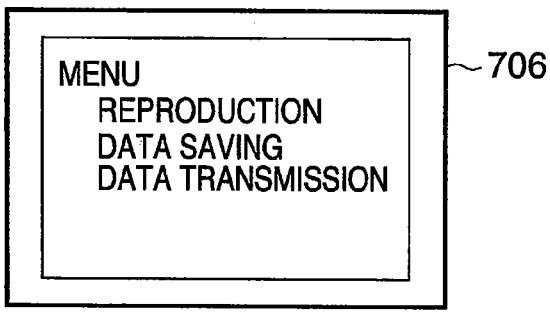
Figure 8:
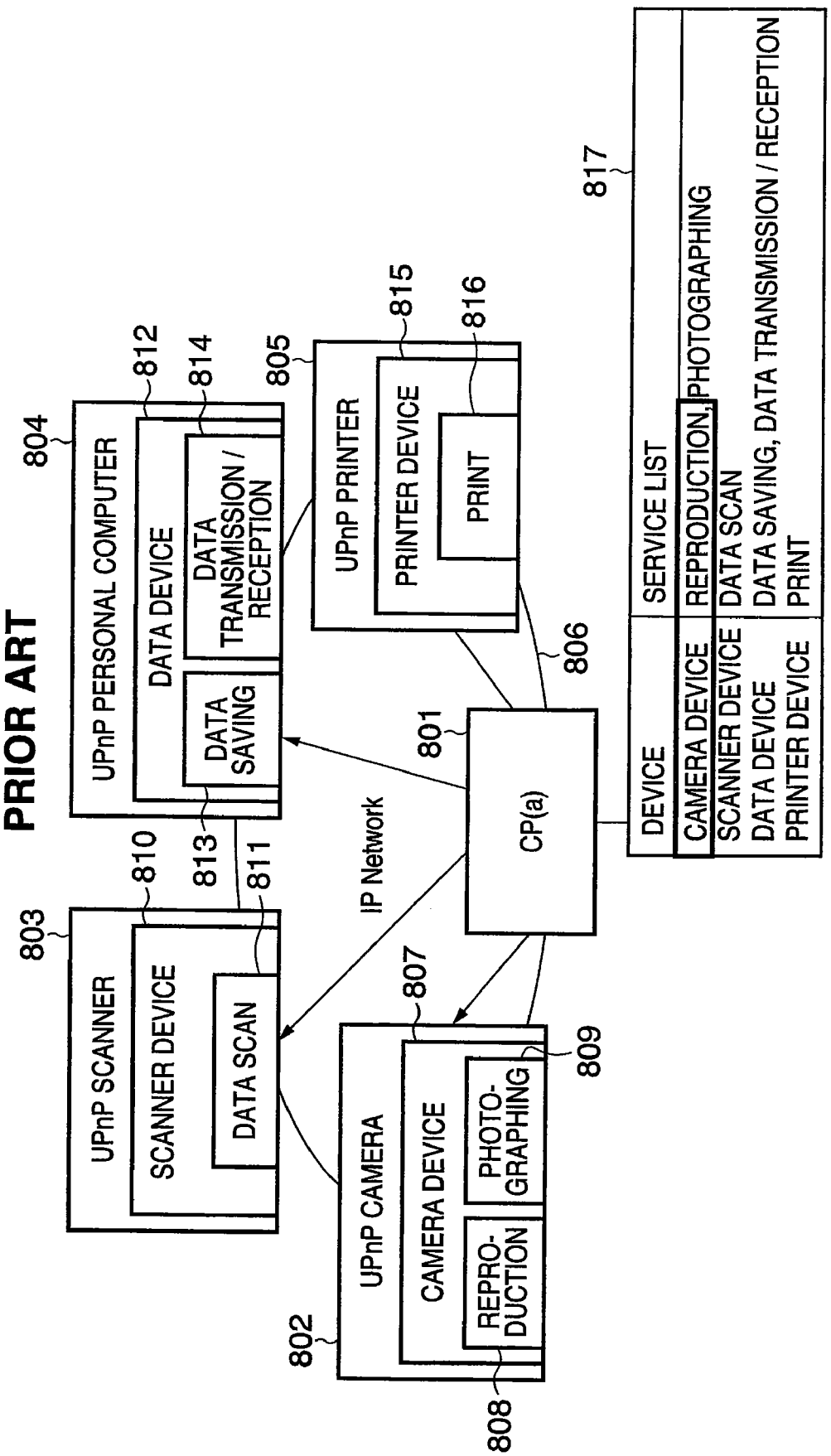
FIG. 8 is a view showing the arrangement of a network connected to UPnP supporting information processing apparatuses according to a prior art.

As shown in FIG. 7, when the digital camera A 404 connects to the network, usable services are the reproduction service of the display device and the photographing service of the camera device, as indicated by a service list 702. Hence, a menu 703 is displayed on the digital camera A 404.

When the digital camera B 504 connects to the network, usable services are the reproduction service of the display device and the photographing service of the camera device, as indicated by a service list 705. Hence, a menu 706 is displayed on the digital camera B 504.

In the present embodiment, when a device with restrictions on the access and operation newly connects to a network, a proxy service providing apparatus with a defined parent-child relationship creates a replica service in accordance with the parent-child relationship and provides the service to the device with restrictions on the access and operation. The device with restrictions on the access and operation can use the replica service. It is therefore possible to implement functions more than those obtained by direct access. Additionally, even devices having the same device category and capability can use different services based on the definition of the parent-child relationship. This raises the security level.

The present invention can also be achieved by supplying a storage medium which records software program codes for implementing the functions of the above-described embodiments to a system or apparatus and causing the computer of the system or the like to read out and execute the program codes stored in the storage medium.

In this case, the program codes read out from the storage medium implement the functions of the above-described embodiments by themselves, and the program codes themselves and the storage medium which stores the program codes constitute the present invention.

Examples of the storage medium to supply the program codes are a flexible disk, hard disk, optical disk, magnetooptical disk, CD-ROM, CD-R, magnetic tape, nonvolatile memory card, and ROM.

The functions of the above-described embodiments are also implemented when the OS running on the computer partially or wholly executes actual processing based on the instructions of the program codes read out by the computer.

The functions of the above-described embodiments are also implemented when the program codes read out from the storage medium are written in the memory of a function expansion unit connected to the computer, and the CPU executes actual processing based on the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-106501, filed Apr. 7, 2006, which is hereby incorporated by reference herein in its entirety.

What is claimed is:

1. A proxy service providing apparatus which connects a plurality of first devices which provide services and a second device which does not directly use the services provided by the plurality of first devices, via a network, comprising:
   a storage unit adapted to store a first table describing a correspondence relationship between each of the plurality of first devices and a service provided by each of the plurality of first devices, and a second table describing a correspondence relationship between the second device and a service providable to the second device among the services provided by the plurality of first devices;
   a processor including a determination unit adapted to determine a parent-child relationship between the proxy service providing apparatus and the second device based on the second table;

the processor including a service search unit adapted to, upon receiving, from the second device, a request for provision of the service provided by each of the plurality of the first devices, search for the service providable to the second device based on the first table and the second table stored in the storage unit; and a providing unit adapted to replicate the service provided by each of the plurality of first devices and provide a service, corresponding to the service providable to the second device obtained as a search result of the service search unit among the replicated service, to the second device based on a determination result of the determination unit.

2. The apparatus according to claim 1, wherein the providing unit replicates all services provided by the devices connected to the network.

3. The apparatus according to claim 1, wherein the providing unit replicates only some of services provided by at least one device connected to the network.

4. The apparatus according to claim 1, wherein if a combined service is creatable by combining a plurality of services providable to the connection device obtained as the search result of the service search unit, the providing unit creates such a combined service by combining the plurality of services providable to the connection device obtained as the search result of the service search unit and provides the combined service to the connection device.

5. A service providing method by a proxy service providing apparatus which connects a plurality of first devices which provide services and a second device which does not directly use the services provided by the plurality of first devices, via a network, the method comprising:

a storing step of storing in a storage unit a first table describing a correspondence relationship between each of the plurality of first devices and a service provided by each of the plurality of first devices, and a second table describing a correspondence relationship between the second device and a service providable to the second device among the services provided by the plurality of first devices;

a determination step of determining a parent-child relationship between the proxy service providing apparatus and the second device based on the second table;

a service searching step of, upon receiving, from the second device, a request for provision of the service provided by each of the plurality of the first devices, searching for the service providable to the second device based on the first table and the second table stored in the storage unit; and a providing step of replicating the service provided by each of the plurality of first devices and providing a service, corresponding to the service providable to the second device obtained as a search result in the searching step among the replicated services, to the second device based on a determination result in the determination step.

6. A network system comprising a plurality of devices connected to a network, wherein the plurality of devices include at least one proxy service providing apparatus which connects a plurality of first devices which provide services, and at least one remote control apparatus which does not directly use the services provided by the plurality of first devices, and wherein the proxy service providing apparatus includes:

a storage unit adapted to store a first table describing a correspondence relationship between each of the plurality of first devices and a service provided by each of the plurality of first devices, and a second table describing a correspondence relationship between the remote control apparatus and a service providable to the remote control apparatus among the services provided by the plurality of first devices;

a processor including a determination unit adapted to determine a parent-child relationship between the proxy service providing apparatus and the remote control apparatus based on the second table;

the processor including a service search unit adapted to search for the service providable to the remote control apparatus based on the first table and the second table stored in the storage unit, and a providing unit adapted to replicate the service provided by each of the plurality of first devices and provide a service, corresponding to the service providable to the remote control apparatus obtained as a search result of the service search unit among the replicated services, to the remote control apparatus based on a determination result of the determination unit.

7. The system according to claim 6, wherein said remote control apparatus includes:

an apparatus search unit adapted to search for the proxy service providing apparatus, and a request unit adapted to request the proxy service providing apparatus obtained as a search result of the apparatus search unit to provide the service provided by each of the plurality of first devices connected to the network, wherein the proxy service providing apparatus executes search by the service search unit in accordance with the request by the request unit.

* * * * *